United States Patent
Eder et al.

(10) Patent No.: US 11,909,124 B2
(45) Date of Patent: Feb. 20, 2024

(54) METHOD AND APPARATUS FOR TEMPERATURE-BASED ANTENNA SELECTION

(71) Applicant: Apple Inc., Cupertino, CA (US)

(72) Inventors: Franz J. Eder, Neubiberg (DE); Carlo Tosetti, Munich (DE); Kenan Kocagoez, Fürth (DE); Prashant H. Vashi, San Jose, CA (US); Murali Mohan Chakka, Los Gatos, CA (US); Muthukumaran Dhanapal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 17/246,208

(22) Filed: Apr. 30, 2021

(65) Prior Publication Data
US 2022/0352627 A1 Nov. 3, 2022

(51) Int. Cl.
*H01Q 3/24* (2006.01)
*H04B 7/06* (2006.01)
(Continued)

(52) U.S. Cl.
CPC ............... *H01Q 3/24* (2013.01); *H01Q 1/02* (2013.01); *H01Q 3/34* (2013.01); *H01Q 25/002* (2013.01); *H04B 17/13* (2015.01)

(58) Field of Classification Search
CPC ...... H01Q 25/002; H01Q 25/00; H01Q 21/00; H01Q 3/24; H01Q 1/24; H01Q 3/34;
(Continued)

(56) References Cited

U.S. PATENT DOCUMENTS 8,934,852 B2 * 1/2015 Yan ...................... H04B 7/0404
455/67.11
9,882,278 B2 * 1/2018 Liou ...................... H01Q 1/245
(Continued)

FOREIGN PATENT DOCUMENTS

| EP | 3506524 A1 | 7/2019 |
| EP | 3681043 A1 | 7/2020 |

(Continued)

OTHER PUBLICATIONS

Partial European Search Report for European Patent Application No. 22165994.9, dated Aug. 24, 2022; 20 pgs.

*Primary Examiner* — Tho G Phan
(74) *Attorney, Agent, or Firm* — FLETCHER YODER PC

(57) ABSTRACT

An electronic device having multiple antenna groups for data communication may determine a temperature of a first antenna group and determine a power gain of a second antenna group. The electronic device may communicate using the second antenna group in response to determining that the temperature of the first antenna group exceeds a temperature threshold and the power gain of the second antenna group exceeds a gain threshold. In some embodiments, the electronic device may receive communication link preferences, determine an antenna group that is disposed outside of thermal hotspots of the electronic device, and determine a beam that enables the communication link preferences via the antenna group. The electronic device may then transmit or receive data via the antenna group by forming the beam.

20 Claims, 9 Drawing Sheets

(51) Int. Cl.
*H04B 17/13* (2015.01)
*H01Q 1/02* (2006.01)
*H01Q 3/34* (2006.01)
*H01Q 25/00* (2006.01)

(58) Field of Classification Search
CPC ........ H04B 17/13; H04B 7/06; H04B 7/0608; H04B 7/08; H04B 7/0814
See application file for complete search history.

(56) References Cited

U.S. PATENT DOCUMENTS

| | | | |
|---|---|---|---|
| 10,547,344 B2 * | 1/2020 | Lukaszewski | ......... H04B 17/14 |
| 10,812,179 B2 * | 10/2020 | Petranovich | ....... H04B 7/18515 |
| 10,833,740 B1 * | 11/2020 | Lin | ...................... H04B 7/0617 |
| 10,992,368 B1 | 4/2021 | Chisu et al. | |
| 11,012,164 B2 * | 5/2021 | El-Hassan | ............... H04B 17/29 |
| 2014/0199952 A1 | 7/2014 | Sandhu et al. | |
| 2020/0328785 A1 | 10/2020 | Lee et al. | |
| 2021/0068077 A1 | 3/2021 | Raghavan et al. | |
| 2022/0416418 A1 * | 12/2022 | Fan | ......................... H01Q 3/36 |

FOREIGN PATENT DOCUMENTS

| | | |
|---|---|---|
| WO | 2020005294 A1 | 1/2020 |
| WO | 2021050311 A1 | 3/2021 |

* cited by examiner

METHOD AND APPARATUS FOR TEMPERATURE-BASED ANTENNA SELECTION

BACKGROUND

The present disclosure relates generally to wireless communication using an electronic device, and more specifically to techniques for selecting antennas of the electronic device for wireless communication.

An electronic device may include multiple antennas and/or multiple antenna groups disposed in different areas of the electronic device, and use one or more of the antennas and/or antenna groups to transmit and/or receive data. However, a temperature of the one or more of the antennas and/or antenna groups may increase over time when in operation. If the temperature of the one or more antennas and/or antenna groups becomes sufficiently high, the high temperature may reduce a lifespan of components and/or circuitry of the electronic device, and/or the one or more of the antennas and/or antenna groups themselves, which may degrade communication quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An aspect of the disclosure provides an electronic device that may select one or more antenna groups for data communication. The electronic device may include multiple antenna groups, transmit circuitry and receive circuitry communicatively coupled to the multiple antenna groups, and processing circuitry. The processing circuitry may communicate with a communication hub using at least one antenna group. The processing circuitry may switch from operating a first antenna group to a second antenna group for data communication with the communication hub based on temperature and power gain of the antenna groups. The processing circuitry may determine a temperature of the first antenna group and determine a power gain of the second antenna group for receiving data from the communication hub. The processing circuitry may cause the transmit circuitry to communicate with the communication hub using the second antenna group in response to determining that the temperature of the first antenna group exceeds a temperature threshold and the power gain of the second antenna group for receiving data from the communication hub exceeds a gain threshold.

An additional or alternative aspect of the disclosure provides a method. The method may include using at least one processor to determine one or more antenna groups of multiple antenna groups of an electronic device that have a temperature less than a temperature threshold, a power gain for the one or more antenna groups that have the temperature less than the temperature threshold when forming a beam, and form the beam using an antenna group of the one or more antenna groups having a highest power gain.

Yet another additional or alternative aspect of the disclosure provides a tangible, non-transitory, machine-readable medium, comprising machine-readable instructions that, when executed by a processor, cause the processor to receive one or more communication link preferences to execute one or more software applications on an electronic device, and determine whether at least one antenna group of the electronic device is disposed outside of one or more thermal hotspots of the electronic device. Moreover, in response to determining that the at least one antenna group of the electronic device is disposed outside of one or more thermal hotspots of the electronic device, the instructions may cause the processor to determine whether a beam enables transmitting data or receiving data with the communication link preferences via the at least one antenna group. Furthermore, in response to determining that the beam enables transmitting data or receiving data with the communication link preferences, via the at least one antenna group, the instructions may cause the processor to cause transmit circuitry of the electronic device to transmit data or receive circuitry of the electronic device to receive data via the at least one antenna group by forming the beam.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
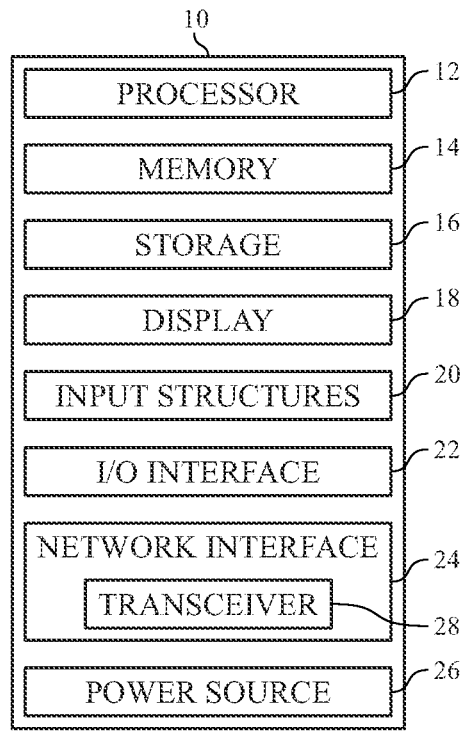
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to mitigating and/or preventing antennas of an electronic device from operating at high temperature to maintain or increase a lifespan of the electronic device and/or avoid degradation in communication quality when using the antennas. The electronic device may include multiple antenna groups, each of which may include one or more antennas disposed in different areas of the electronic device.

To mitigate and/or prevent an antenna group from operating at a high temperature, the electronic device (e.g., one or more processors of the electronic device) may select, prioritize, and/or use an antenna group with a lower temperature (e.g., lower than a temperature threshold) to transmit and/or receive data. In some embodiments, the electronic device may ensure sufficient or superior antenna performance by initially determining a set of antenna groups with temperatures lower than a temperature threshold when forming beams (e.g., in different directions), and then selecting an antenna group with a performance (e.g., power gain) higher than a threshold performance value (e.g., threshold gain value) and/or having the highest performance (e.g., power gain) from the set of antenna groups.

For example, the electronic device may determine a temperature of each antenna group based on receiving temperature measurements associated with each respective antenna group, and compare the temperatures to a temperature threshold to determine antenna groups with low temperatures. In certain embodiments, the electronic device may compare the temperature of each antenna group to a different, predetermined temperature threshold (e.g., based on a location of a respective antenna group in the electronic device, surrounding components with respect to the respective antenna group in the electronic device, ambient temperatures and/or other conditions near the respective antenna group, and/or empirical operating data of the respective antenna group).

To determine a performance (e.g., a power gain, signal quality, signal to noise ratio, reference signal received power, reference signal received quality, signal to interference plus noise ratio, signal to noise plus interference ratio, and so on) of each antenna group, the electronic device may configure each antenna group with multiple test beam configurations corresponding to multiple beams, and determine the power gain of each antenna group for each beam.

In some embodiments, the electronic device may prioritize selecting an antenna group disposed outside thermal hotspots of the electronic device for transmitting and/or receiving data. A thermal hotspot may include an area of the electronic device that may exhibit an increased rise in temperature due to operation of an antenna group at that location. That is, an antenna array at a thermal hotspot may see an increased rise in temperature during operation when compared to the same antenna array operating at a non-thermal hotspot location. As such, the electronic device may select the antenna group based on whether the antenna group is disposed outside of the thermal hotspots and is capable of transmitting and/or receiving data at a data rate (e.g., throughput) requested by (e.g., a software application of) the electronic device.

FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), a memory 14, a nonvolatile storage 16, a display 18, input structures 20, an input/output (I/O) interface 22, a network interface 24, and a power source 26. The various functional blocks shown in FIG. 1 may include hardware elements (including circuitry), software elements (including computer code stored on a computer-readable medium), or a combination of both hardware and software elements.

The processor 12, the memory 14, the nonvolatile storage 16, the display 18, the input structures 20, the input/output (I/O) interface 22, the network interface 24, and/or the power source 26 may each be communicatively coupled directly or indirectly (e.g., through or via another component, a communication bus, and/or a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device, user equipment, or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, firmware, hardware, or any combination thereof.

Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processor 12 may perform the various functions described herein and below. In some embodiments, the processor 12 may include an application processor and/or a baseband processor to facilitate performing various functions such as Radio Frequency (RF) operations associated with transmitting and receiving data. For example, the processor 12 may receive different temperature measurements associated with different antenna groups (not shown in FIG. 1) to determine antenna groups with a temperature below a temperature threshold. In some embodiments, the temperature threshold may be based on a location of a respective antenna group in the electronic device 10, surrounding components with respect to the respective antenna group in the electronic device 10, ambient temperatures and/or other conditions near the respective antenna group, and/or empirical operating data of the respective antenna group.

Moreover, the processor 12 may determine a power gain of different antenna groups when forming one or more beams. Subsequently, the processor 12 may select an antenna group with low temperature and high power gain when forming a beam in a target direction. In specific embodiments, the processor 12 may select the antenna group based at least in part on a position of the antenna group with respect to one or more thermal hotspots of the electronic device 10.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 20 of the electronic device 10 may enable a user to interact with the electronic device 10 (e.g., pressing a button to increase or decrease a volume level). The I/O interface 22 may enable electronic device 10 to interface with various other electronic devices, as may the network interface 24. The network interface 24 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network. In particular, the network interface 24 may include, for example, one or more interfaces for using a Release-15 cellular communication standard of the 5G specifications that include the millimeter wave (mmWave) frequency range (e.g., 24.25-300 gigahertz (GHz)). The network interface 24 of the electronic device 10 may allow communication over the aforementioned networks (e.g., 5G, Wi-Fi, LTE-LAA, and so forth).

The network interface 24 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 24 may include a transceiver 28. The transceiver 28 may support transmission and receipt of various wireless signals via one or more antennas (not shown in FIG. 1). In some embodiments, all or portions of the transceiver 28 may be disposed within the processor 12. For example, the application processor and/or the baseband processor may facilitate transmission and receipt of the wireless signals using the transceiver 28 and via the one or more antennas.

The power source 26 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
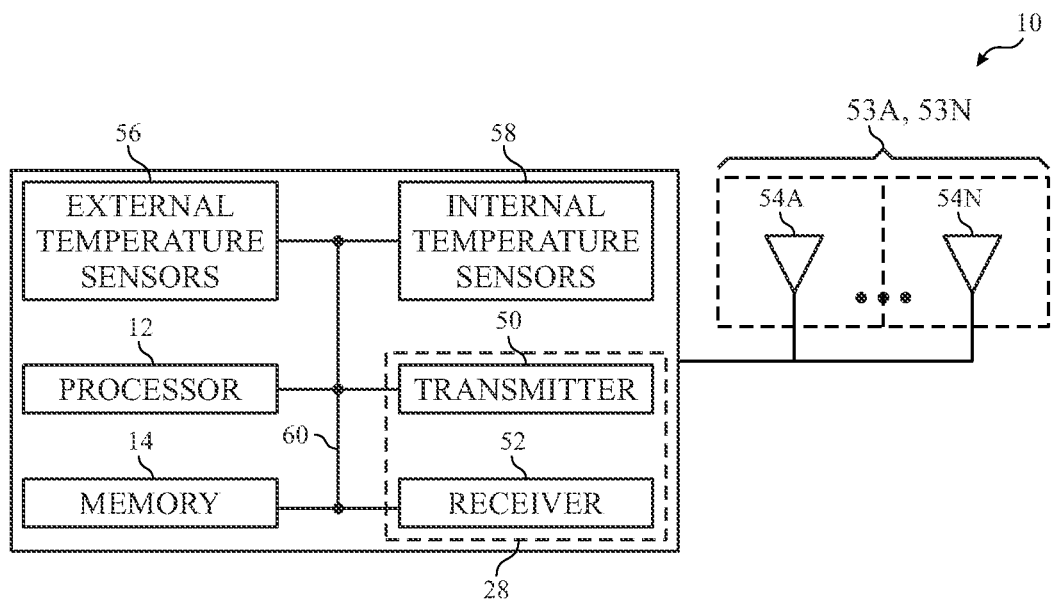
FIG. 2 is a functional block diagram of the electronic device of FIG. 1 that may implement the components shown in FIG. 1 and/or the circuitry and/or components described in the following figures, according to embodiments of the present disclosure.

FIG. 2 is a functional block diagram of the electronic device 10 that may implement the components shown in FIG. 1 and/or circuitry and/or components described in the following figures, according to some embodiments of the present disclosure. As illustrated, the processor 12, the memory 14, the transceiver 28, a transmitter 50, a receiver 52, antenna groups 53 (illustrated as 53A-53N) each made up of one or more antennas 54 (illustrated as 54A-54N), external temperature sensors 56, and/or internal temperature sensors 58 may be communicatively coupled directly or indirectly (e.g., through or via another component, a communication bus, a network) to one another to facilitate transmitting and/or receiving data between one another.

The electronic device 10 may include the transmitter 50 and the receiver 52 that may respectively enable transmission and reception of data between the electronic device 10 and a remote location. For example, the transmitter 50 and/or the receiver 52 may transmit data to and/or receive data from an external transceiver (e.g., in the form of a cell, eNB (E-UTRAN Node B or Evolved Node B), base stations, and the like, using a network in a direction of the electronic device 10. As illustrated, the transmitter 50 and the receiver 52 may be combined into the transceiver 28.

One or more antennas 54A through 54N may be electrically coupled to the transceiver 28 of the electronic device 10. The antennas 54A-54N may be configured in an omnidirectional or directional configuration, in a single-beam, dual-beam, or multi-beam arrangement, and so on. Each antenna 54 may be associated with one or more beams, various beam configurations, and/or one or more antenna groups 53. Moreover, each antenna 54A-54N of a respective antenna group 53 may emit a radio frequency signal that may be constructively and/or destructively combined with radio frequency signals emitted by other antennas 54-54N of the respective antenna group 53 to form a beam (e.g., that may enable mmWave and/or 5G communication). That is, each antenna group 53 may communicate data in a target direction based on individual signals emitted by the constituent antennas 54. In some embodiments, each antenna group 53 may be coupled to a designated transceiver 28 (e.g., separate from other designated transceivers coupled to other antenna groups 53). Accordingly, the electronic device 10 may include multiple transmitters 50, multiple receivers 52, multiple transceivers 28, and/or multiple antennas 54 for communication per various communication standards.

The transmitter 50 may wirelessly transmit packets having different packet types or functions. For example, the transmitter 50 may transmit packets of different types generated by the processor 12. The receiver 52 may wirelessly receive packets having different packet types. In some examples, the receiver 52 may detect a type of a packet used and process the received packets accordingly. In some embodiments, the transmitter 50 and the receiver 52 may transmit and receive information via other wired and/or wireless systems or devices. Moreover, in some embodiments, the transmitter 50 and the receiver 52 may be isolated by any viable devices to reduce interference when transmitting data and/or receiving data between the respective circuitry.

The external temperature sensors 56 and the internal temperature sensors 58 may each include one or multiple temperature sensors to measure and provide external and internal temperatures of the electronic device 10, respectively. Moreover, each of the external temperature sensors 56 and the internal temperature sensors 58 may provide an updated temperature measurement according to a respective temperature measurement time cycle. Accordingly, the electronic device 10 may use the latest temperature measurements for selecting an antenna group 53 to form a beam in a target direction, as will be appreciated.

In some embodiments, the external temperature sensors 56 may be disposed proximal to a surface of the electronic device 10 to measure an external temperature of the electronic device 10. For example, each of the external temperature sensors 56 may measure a temperature of the surface of the electronic device 10. In some embodiments, the external temperature sensors 56 may include skin temperature sensors, ambient air temperatures, and so on. The internal temperature sensors 58 may be disposed proximal to one or more components of the electronic device 10. That is, the internal temperature sensors 58 may be disposed proximal to the antennas 54, the processor 12, the memory 14, the non-volatile storage 16, the display 18, the input structures 20, the I/O interface 22, the network interface 24, the power source 26, the transceiver 28, the transmitter 50, the receiver 52, and/or other components. The internal temperature sensors 58 may include circuit junction temperature sensors, pixel temperature sensors, display temperature sensors, processor temperature sensors, memory temperature sensors, and so on. Accordingly, each of the internal temperature sensors 58 may measure a temperature of one or more components of the electronic device 10.

Moreover, each antenna group 53 may be disposed proximal to an internal temperature sensor 58 or external temperature sensor 56. Accordingly, the internal temperature sensor 58 or external temperature sensor 56 disposed proximal to (e.g., closest to) each respective antenna group 53 may provide an estimation or determination of the temperature of the respective antenna group 53. Thus, the processor 12 may receive the internal or external temperature measurements from the internal temperature sensor 58 or the external temperature sensor 56 to determine or estimate a temperature of each antenna group 53 of the electronic device 10.

However, in some cases, the processor 12 may perform processing and/or normalization on a temperature to more accurately reflect the temperature at the antenna group 53. That is, an internal temperature sensor 58 may be disposed proximal to an antenna group 53 (e.g., be the nearest temperature sensor 56, 58 to the antenna group 53), as well as proximal to another heat-generating component of the electronic device 10 that may cause the internal temperature measurement to not accurately reflect the temperature at the proximal antenna group 53. Moreover, as mentioned above, the external temperature sensors 56 may measure an external temperature of the electronic device. Such temperature sensors may provide indirect temperature measurements of the antennas 54 of different antenna groups 53. Accordingly, the processor 12 may perform processing and/or normalization of a received temperature measurement to realize a more accurate temperature at an antenna group 53.

In any case, using the external and internal temperature sensors 56, 58, the processor 12 may determine "hot"

antenna groups 53 with a temperature exceeding a temperature threshold. That said, in some embodiments, the processor 12 may use different temperature thresholds for the external temperature sensors 56 and the internal temperature sensors 58. Indeed, in specific embodiments, the processor 12 may use different temperature thresholds for each temperature sensor that corresponds to an antenna group 53 (e.g., the nearest antenna group 53). In specific embodiments, the external temperature threshold may be in the range of 30-50 degrees Celsius (e.g., 33-48 degrees Celsius, 36-40 degrees Celsius, and so on) and the internal temperature threshold may be in the range of 100-200 degrees Celsius (e.g., 105-115 degrees Celsius, 115-125 degrees Celsius, 125-135 degrees Celsius, and so on).

In this manner, the processor 12 may determine and select between antenna groups 53 with power gains exceeding a gain threshold (e.g., when forming a beam in a target direction) that have temperatures below a corresponding temperature threshold. Moreover, when a temperature of a previously selected (e.g., currently operative) antenna group 53 forming a beam in a target direction exceeds a corresponding temperature threshold, the processor 12 may switch to another antenna group 53 with high power gain and low temperature to form a beam in the target direction, if available.

In some embodiments, the processor 12 may switch to another antenna group 53 without delay when the high temperature of a currently operative antenna group 53 may reduce a lifespan of the electronic device 10. As mentioned above, the internal temperature measurements received from the internal temperature sensors 58 may be associated with one or more components disposed inside the electronic device 10 (e.g., the antennas 54). Accordingly, a high temperature measurement of the internal temperature measurements may imminently result in decreased lifespan of the one or more components of the electronic device 10. For example, the processor 12 may switch antenna groups 53 without a delay when the temperature is rising faster than a threshold, a temperature reading of temperature sensors is higher than a threshold, a temperature of the selected antenna group 53 is determined to be higher than a threshold, among other scenarios.

Accordingly, the processor 12 may switch antenna groups 53 to prevent a reduction of lifespan of the electronic device 10. In such embodiments, to proceed without delay, the processor 12 may skip acquiring (e.g., requesting and receiving, searching for) a new beam configuration (e.g., from a base station and/or a cellular network) for the antenna group 53 with lower temperature. As such, the processor 12 may operate the antenna group 53 with lower temperature with the same beam configuration used by the currently operating antenna group 53 (e.g., the hot antenna group) for transmitting and/or receiving data. For example, the processor 12 may transmit and receive data with a communication hub (e.g., a base station and/or a cellular network operator) using the antenna group 53 with lower temperature using the beam configuration of the currently operating antenna group 53. That said, using the same beam configuration of the currently operating antenna group 53 with the antenna group 53 with lower temperature (e.g., not requesting and receiving a new beam configuration specifically configured for the antenna group 53 with lower temperature) may reduce communication performance (e.g., power gain) of the antenna group 53 with lower temperature.

In additional or alternative embodiments, the processor 12 may switch the antenna groups 53 after requesting and receiving the new beam configuration for the antenna group 53 with lower temperature (e.g., from a communication hub). For example, the processor 12 may delay switching between the antenna groups 53 based on a time (e.g., a threshold time period) for requesting and receiving the new beam configuration elapsing and/or an indication of receiving the new beam configuration associated with the antenna group 53 with lower temperature. In some embodiments, the processor 12 may delay switching when the high temperature is determined based on temperature measurements of the external temperature sensors 56. That is, the processor 12 may switch antenna groups 53 after a delay when a temperature of currently operative antenna group 53 exceeds the temperature threshold based on temperature measurements of the external temperature sensors 56. In specific embodiments, the processor 12 may also or alternatively switch antenna groups 53 after a delay based on high internal temperature measurements of specific internal temperature sensors 58.

In yet another embodiment, the processor 12 may use the temperature measurements from the external temperature sensors 56 and/or internal temperature sensors 58 to dynamically determine thermal hotspots of the electronic device 10. A thermal hotspot may include an area of the electronic device that may exhibit an increased rise in temperature due to operation of an antenna group at that location. That is, an antenna array at a thermal hotspot may see an increased rise in temperature during operation when compared to the same antenna array operating at a non-thermal hotspot location. Moreover, in certain embodiments, the electronic device 10 may store (e.g., in the memory 14) predetermined thermal hotspots (e.g., static thermal hotspots) where the temperature of such thermal hotspots is likely to elevate faster than other areas of the electronic device 10. Accordingly, the processor 12 may determine or select antenna groups 53 disposed outside the thermal hotspots (e.g., dynamic or static) of the electronic device 10 for forming a beam.

The various components of the electronic device 10 may be coupled together by a bus system 60, as illustrated in FIG. 2. The bus system 60 may include a data bus, for example, as well as a power bus, a control signal bus, and a status signal bus, in addition to the data bus. The components of the electronic device 10 may be coupled together to accept and/or provide inputs from/to each other using some other mechanism.

Figure 3A:
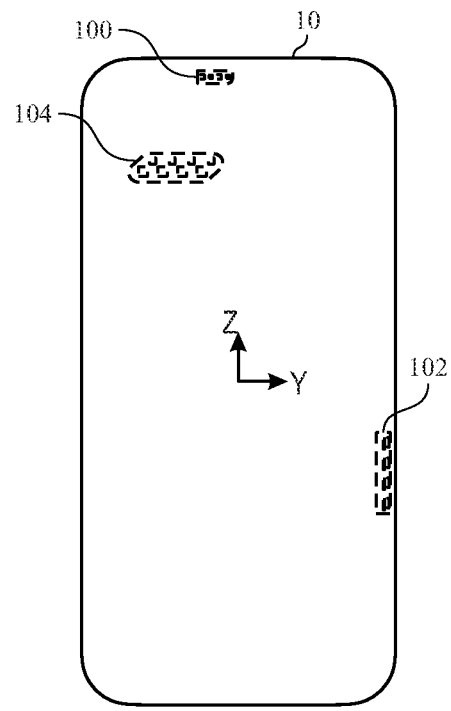
FIG. 3A is a perspective diagram of the electronic device of FIG. 1 from a front side illustrating relative positions of antenna groups in the electronic device, according to an embodiment of the present disclosure.
Figure 3B:
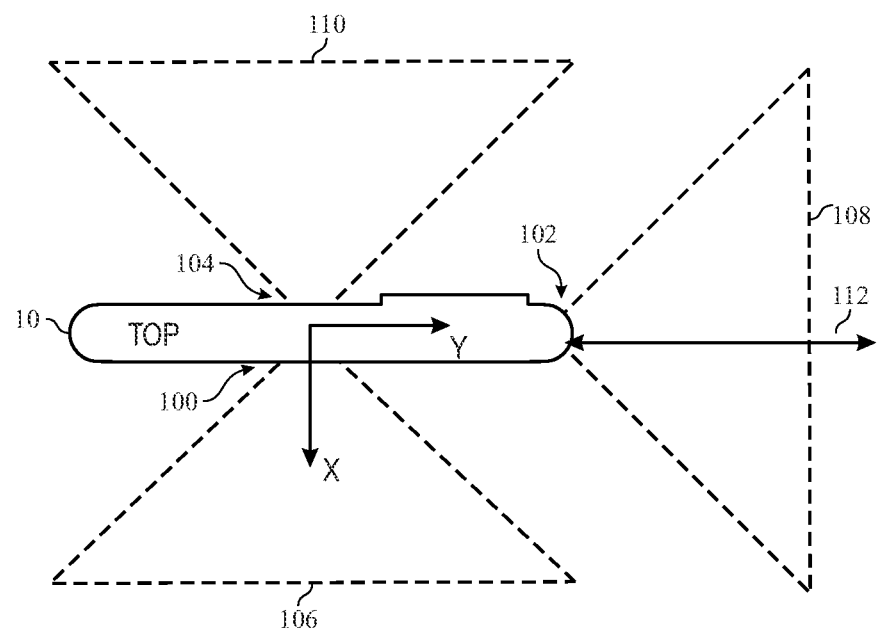
FIG. 3B is a perspective diagram of the electronic device of FIG. 1 from a top side illustrating example beams formed by different antenna groups of the electronic device, according to an embodiment of the present disclosure.

FIGS. 3A and 3B are perspective diagrams of antenna groups 53 (e.g., antenna arrays) of the electronic device 10, according to an embodiment of the present disclosure. FIG. 3A depicts a perspective view of the electronic device 10 from a front side. As illustrated, the electronic device 10 includes a frontside antenna group 100, a side antenna group 102, and a backside antenna group 104. It should be appreciated that in different embodiments, the frontside antenna group 100, the side antenna group 102, and the backside antenna group 104 may be positioned differently in the electronic device 10. Moreover, in different embodiments, the electronic device 10 may include different antenna groups and/or a different number of antenna groups.

FIG. 3B depicts a perspective view of the electronic device 10 from a top side. As illustrated, the frontside antenna group 100 forms a frontside beam 106, the side antenna group 102 forms a side beam 108, and the backside antenna group 104 forms a backside beam 110. However, it should be appreciated that the frontside beam 106, the side beam 108, and the backside beam 110 are formed based on the positions of the antenna groups 100, 104, and 106, and may take different forms or positions based on the implementation of antenna groups in the electronic device 10 in different embodiments. With the foregoing in mind, each of the frontside antenna group 100, the side antenna group 102, and the backside antenna group 104 may transmit and/or receive data by forming respective beams in a respective target direction. However, a power gain of each of the antenna groups 53, including the antenna groups 100, 102, and/or 104, may be different when forming different beams. For example, the electronic device 10 may communicate with a communication hub (e.g., a base station) using the beam 112 with the frontside antenna group 100 and the backside antenna group 104. However, when forming the beam 112, the side antenna group 102 may include a higher power gain. Accordingly, the electronic device 10 may prioritize using the side antenna group 102 to form the beam 112. That is, the electronic device 10 may factor in power gain when selecting an antenna group (e.g., 100, 102, 104) to communicate with.

Moreover, as mentioned above and discussed in further detail below, the electronic device 10 may select and use an antenna group 53 having a temperature less than a threshold temperature. Accordingly, to transmit and/or receive data with a communication hub, the electronic device 10 may select and use the antenna groups 53 with temperatures below a temperature threshold and a power gain greater than a gain threshold, when available. That is, the electronic device 10 may additionally or alternatively factor in temperature when selecting an antenna group (e.g., 100, 102, 104) to communicate with.

Figure 4A:
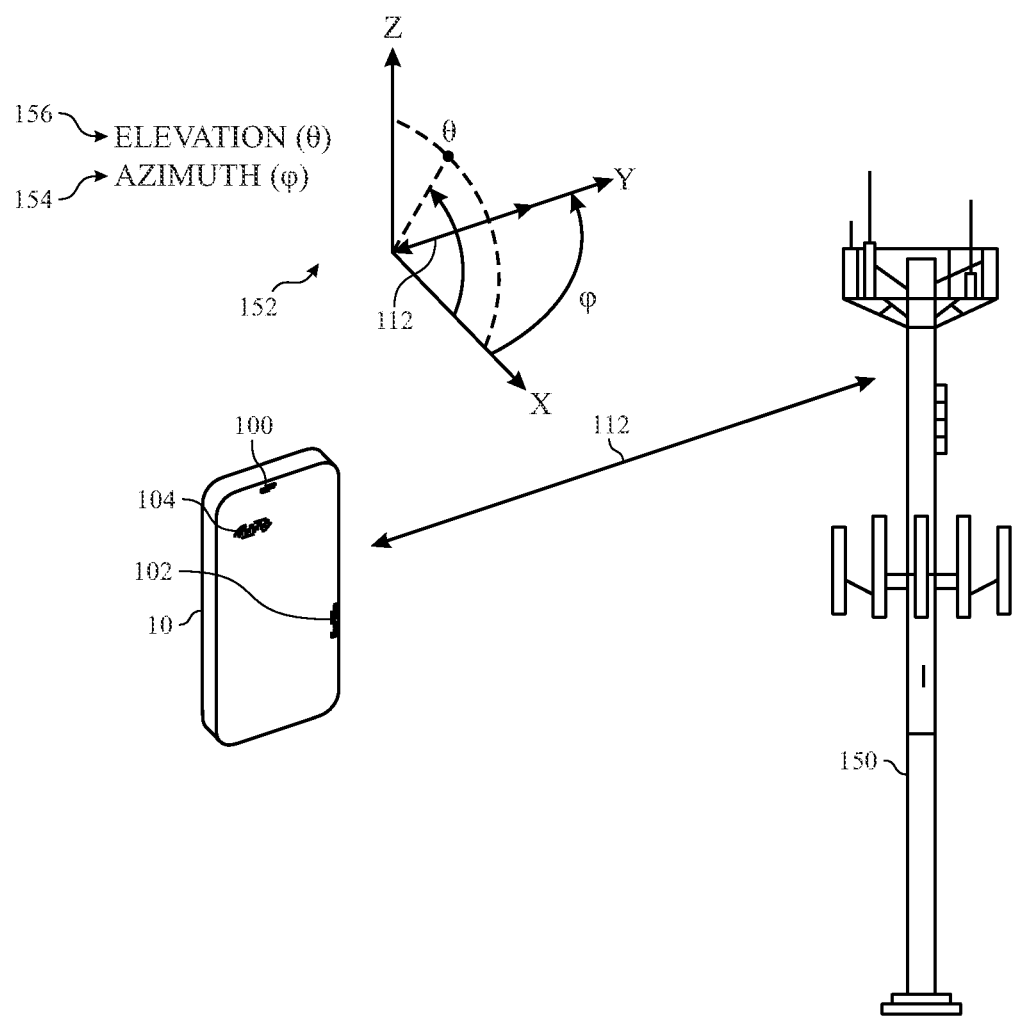
FIG. 4A is a perspective diagram of the electronic device of FIG. 1 forming a beam to communicate with a base station, according to an embodiment of the present disclosure.

With the foregoing in mind, FIG. 4A is a perspective diagram of the electronic device 10 forming the beam 112 to communicate with a base station 150, according to embodiments of the present disclosure. As illustrated, a directional axis 152 indicates an azimuth 154 and an elevation 156 of a beam (e.g., the beam 112) formed by the antenna groups 53 of the electronic device 10. For example, the frontside antenna group 100, the side antenna group 102, and/or the backside antenna group 104 of the electronic device 10 may form the beam 112 having an azimuth of 90 degrees and an elevation of 90 degrees with respect to the respective antenna group.

Although FIG. 4A depicts data communication between the electronic device 10 and the base station 150, it should be appreciated that the electronic device 10 may communicate with additional and/or alternate communication hubs in different embodiments using the techniques discussed herein. For example, the electronic device 10 may use similar systems and methods to transmit data to and/or receive data from another electronic device, a router device, among other things.

Figure 4B:
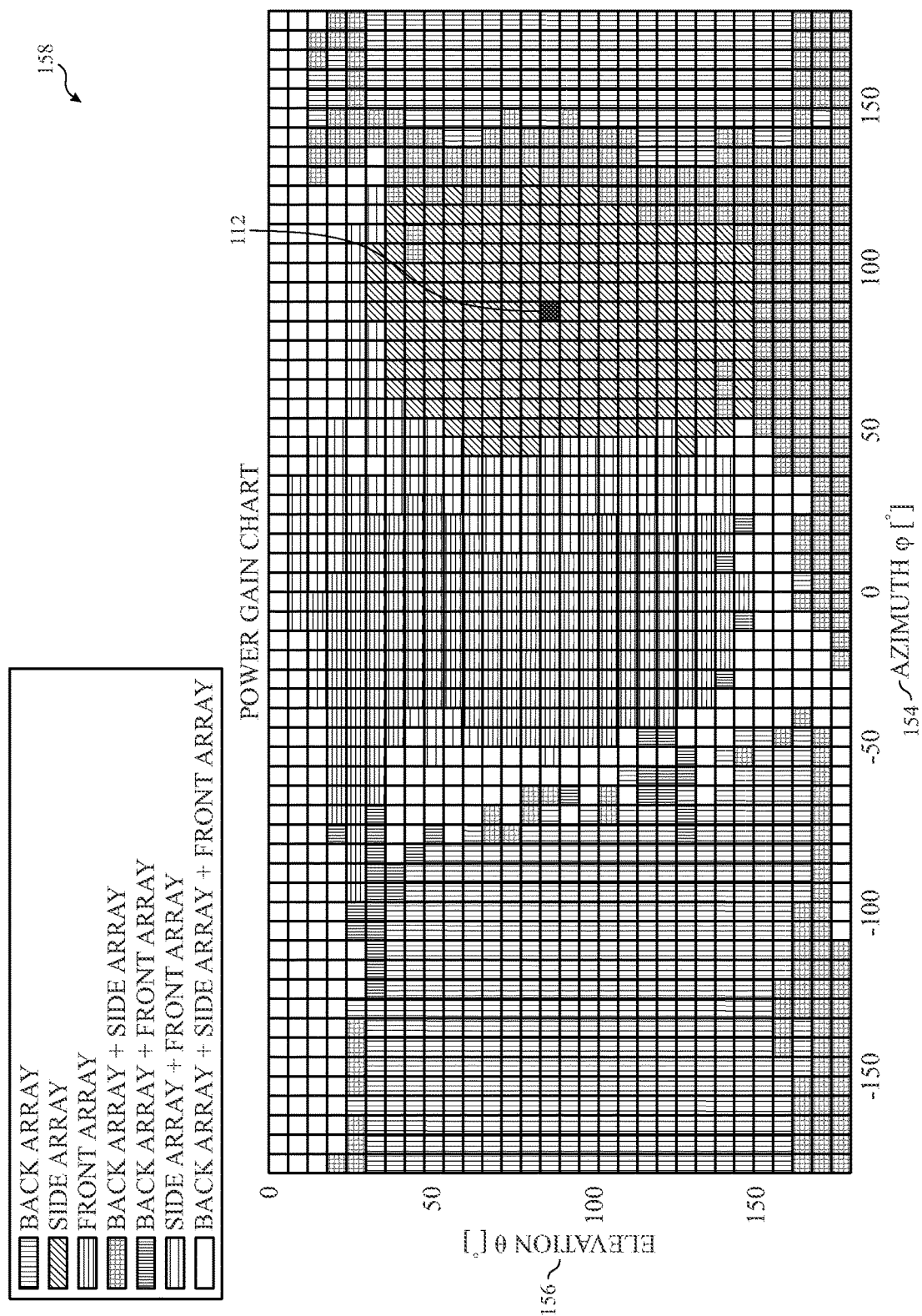
FIG. 4B is a power gain chart illustrating power gain of different antenna groups of the electronic device when forming different beams, according to an embodiment of the present disclosure.

As previously mentioned, power gains of different antenna groups 53 of the electronic device 10 may be different when forming different beams. In some embodiments, the electronic device 10 may determine antenna performance (e.g., power gain, signal quality, and so on) of each antenna group 53 when forming different beams (e.g., in different directions) and store the antenna performance (e.g., in the memory 14). FIG. 4B is a power gain chart 158 indicating the antenna groups 53 of the electronic device 10 having high power gains for each beam (e.g., each having a different direction), according to embodiments of the present disclosure.

As mentioned above, the processor 12 may determine an antenna group 53 as having high power gain when the power gain exceeds a gain threshold. The gain threshold may be a fixed value and/or be relative with respect to power gains of other antenna groups 53. For example, the gain threshold may be 3 decibels less than the highest measured power gain among the antenna groups 53 of the electronic device 10. The power gain chart 158 identifies antenna groups 53 having power gains within 3 decibels of the highest measured power gain among the antenna groups 53 for each beam. That said, in different embodiments, the gain threshold may be selected differently (e.g., the antenna group 53 having the highest gain, the antenna group 53 having gains above a fixed gain value, and so on).

Using the beam 112 (e.g., having an azimuth of 90 degrees and an elevation of 90 degrees) illustrated in FIG. 4A as an example, the power gain chart 158 indicates that the side antenna group 102 has high power gain when forming the beam 112. In the depicted example, the frontside antenna group 100 and the backside antenna group 104 have low power gains less than 3 decibels below the highest measured power gain among the antenna groups 53. Accordingly, the electronic device 10 may prioritize selecting the side antenna group 102 to form the beam 112 when power gain is a factor.

Figure 5:
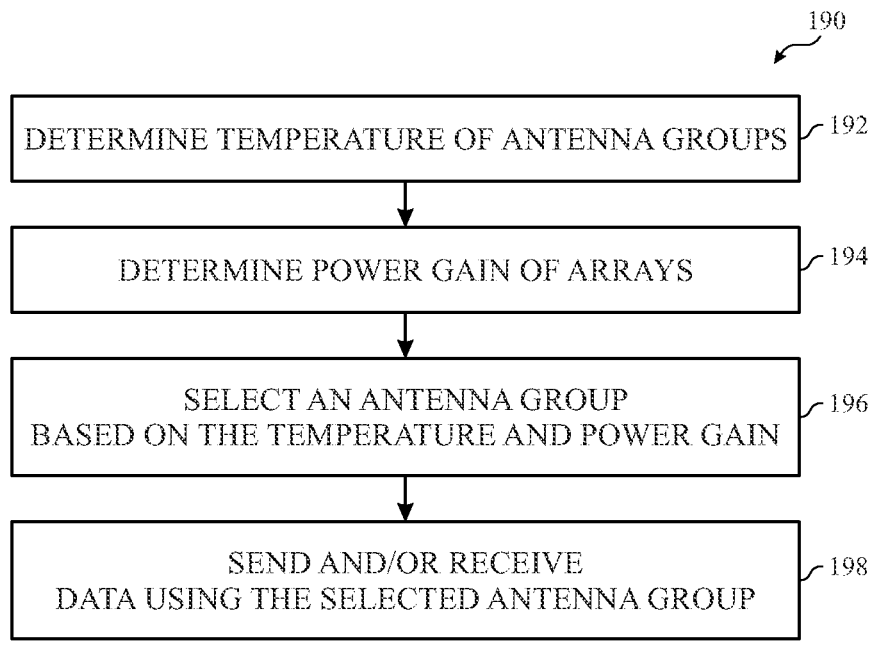
FIG. 5 is a flowchart of a process for selecting an antenna group for transmitting and/or receiving data based on temperature and power gain, according to an embodiment of the present disclosure.

Referring now to FIG. 5, a process 190 is depicted for selecting an antenna group 53 for transmitting and/or receiving data based on temperature and power gain, according to embodiments of the present disclosure. In some embodiments, the processor 12 of the electronic device 10 may perform the process 190. For example, the application processor and/or the baseband processor of the processor 12, described above with respect to FIG. 1, may perform all or a portion of the process 190. While the blocks of the process 190 below are provided in a sequence, it should be understood that the blocks may be performed in different orders, and in some cases, blocks may be skipped entirely.

At block 192, the processor 12 determines a temperature of each antenna group 53. In particular, the processor 12 may receive temperature measurements from the external temperature sensors 56 and/or the internal temperature sensors 58 to determine the temperature of each antenna group 53. For example, the processor 12 may receive a temperature measurement from a closest external temperature sensor 56 and/or the internal temperature sensor 58 to each antenna group 53 to determine the temperature at that antenna group 53.

Subsequently, at block 194, the processor 12 determines power gain (and/or another measure of antenna performance, such as signal quality) of the antenna groups 53. In some embodiments, the processor 12 may determine the antenna groups 53 with high power gains when forming different beams. For example, the processor 12 may determine the antenna groups 53 having power gains within 3 decibels of the highest measured power gain for one or more beams, as reflected in the power gain chart 158 of FIG. 4B described above. In some embodiments, the processor 12 may store and/or update the power gains for the antenna groups 53 when forming each beam. That is, for each beam, the processor 12 may store a power gain for each antenna group 53 when forming the respective beam.

At block 196, the processor 12 selects an antenna group 53 based on the determined temperature and power gains of the antenna groups 53 in blocks 192 and 194. For example, the processor 12 may select the antenna group 53 with highest power gain and a temperature below a temperature threshold. As another example, the processor 12 may select the antenna group 53 with the lowest temperature and a power gain above a gain threshold. In some embodiments, the processor 12 may assign weights to the temperature and to the power gain, and select the antenna group 53 based on applying the weights to the temperatures and power gains of each antenna group 53. Additionally or alternatively, the processor 12 may select the antenna group 53 with antennas 54 disposed outside thermal hotspots of the electronic device 10. As mentioned above, the processor 12 may determine the thermal hotspots based on receiving temperature measurements of different temperature sensors (e.g., based on operations of block 192) or predetermine the thermal hotspots of the electronic device 10. At block 198, the processor 12 sends or receives data using the selected antenna group 53. In this manner, the process 190 enables the processor 12 to select an antenna group 53 for transmitting and/or receiving data based on temperature and power gain.

Figure 6:
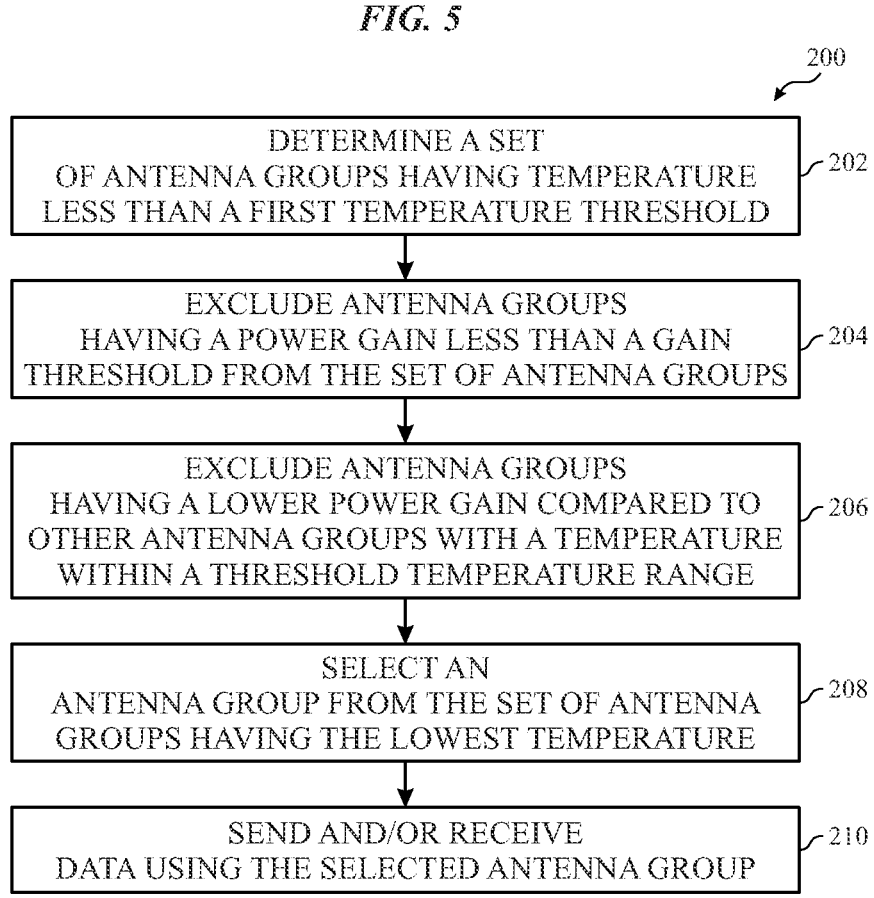
FIG. 6 is a flowchart of a process for selecting an antenna group for transmitting and/or receiving data by grouping antenna groups based on high power gains and low temperatures, according to an embodiment of the present disclosure.

Referring now to FIG. 6, a process 200 is depicted for selecting an antenna group 53 for transmitting and/or receiving data by grouping the antenna groups 53 based on high power gains and low temperatures, according to embodiments of the present disclosure. Similar to the process 190 of FIG. 5, the processor 12 of the electronic device 10 may perform the process 200. For example, the application processor and/or the baseband processor of the processor 12, described above with respect to FIG. 1, may perform all or a portion of the process 200. While the blocks of the process 200 below are provided in a sequence, it should be understood that the blocks may be performed in different orders, and in some cases, blocks may be skipped entirely.

At block 202, the processor 12 may determine a set of antenna groups 53 having temperature less than a temperature threshold. As mentioned above, the temperature threshold may be based on a location of an antenna group 53 in the electronic device 10, surrounding components with respect to the antenna group 53 in the electronic device 10, ambient temperatures and/or other conditions near the antenna group 53, empirical operating data of the respective antenna group 53, the type of sensor detecting the temperature (e.g., the external temperature sensor 56 or the internal temperature sensor 58), and so on. In any case, the processor 12 may exclude antenna groups 53 with temperatures above the temperature threshold from the set of antenna groups 53 to ensure that antenna arrays 53 that have excessive temperature may not be used.

Subsequently, at block 204, the processor 12 may also exclude antenna groups 53 having a power gain less than a gain threshold from the set of antenna groups 53. For example, the processor 12 may receive or determine an uplink power gain, a downlink power gain, or both, of each antenna group 53 when forming one or more beams for transmitting or receiving data. Accordingly, the processor 12 may determine the antenna groups 53 with power gain greater than the gain threshold when forming a target or desired beam (e.g., directed at a communication node or base station). This enables selection of an antenna group 53 for transmitting or receiving data that has a power gain that is close to the performance of the antenna group 53 having the best power gain. Moreover, as discussed above, the gain threshold may be different in different embodiments. In one embodiment, the gain threshold may be based on the highest power gain determined among the antenna groups 53. In a different embodiment, the gain threshold may be a predetermined value stored in the memory 14 of the electronic device 10.

At block 206, the processor 12 excludes antenna groups 53 having a lower power gain compared to other antenna groups 53 with a temperature within a threshold temperature range from the set of antenna groups. That is, the processor 12 may determine antenna groups 53 that have similar temperatures by determining sets of antenna groups 53 that are within the threshold temperature range from one another. For each set of antenna groups 53 that are within the threshold temperature range from one another, the processor 12 may exclude those antenna groups 53 having lower power gain. The threshold temperature range may be predetermined or determined by the processor 12 during runtime, and include any suitable range of temperatures that indicate similar temperature (e.g., 0-25 degrees Celsius, 5 degrees Celsius increments, 10 degrees Celsius increments, and so on). The lower power gain may be defined as below a threshold power gain, such as the threshold power gain discussed above (e.g., 3 decibels less than the highest measured power gain among the set of antenna groups 53). As such, selection of an antenna group 53 that has lower power gain with no or an insignificant temperature advantage may be avoided.

At block 208, the processor 12 may select an antenna group 53 from the set of antenna groups 53 having the lowest temperature. As such, the process 200 prioritizes temperature. In alternative embodiments, the process 200 may prioritize power gain, and select an antenna group 53 from the set of antenna groups 53 having the highest power gain.

In alternative or additional embodiments, at block 206, the processor 12 may determine whether a beam formed using the antenna groups 53 of the set of antenna groups 53 enables an estimated throughput, an estimated latency, or both to execute one or more software applications. In such embodiments, at block 208, the processor 12 may select an antenna group 53 of the set of antenna groups 53 based on determining that the selected antenna group 53 is capable of forming the beam using the estimated throughput, the estimated latency, or both.

At block 210, the processor 12 may send and/or receive data using the selected antenna group 53. In this manner, the process 200 may enable processor 12 to send and/or receive data using an antenna group 53 from a set of antenna groups 53 with a high power gain and a low temperature.

Figure 7:
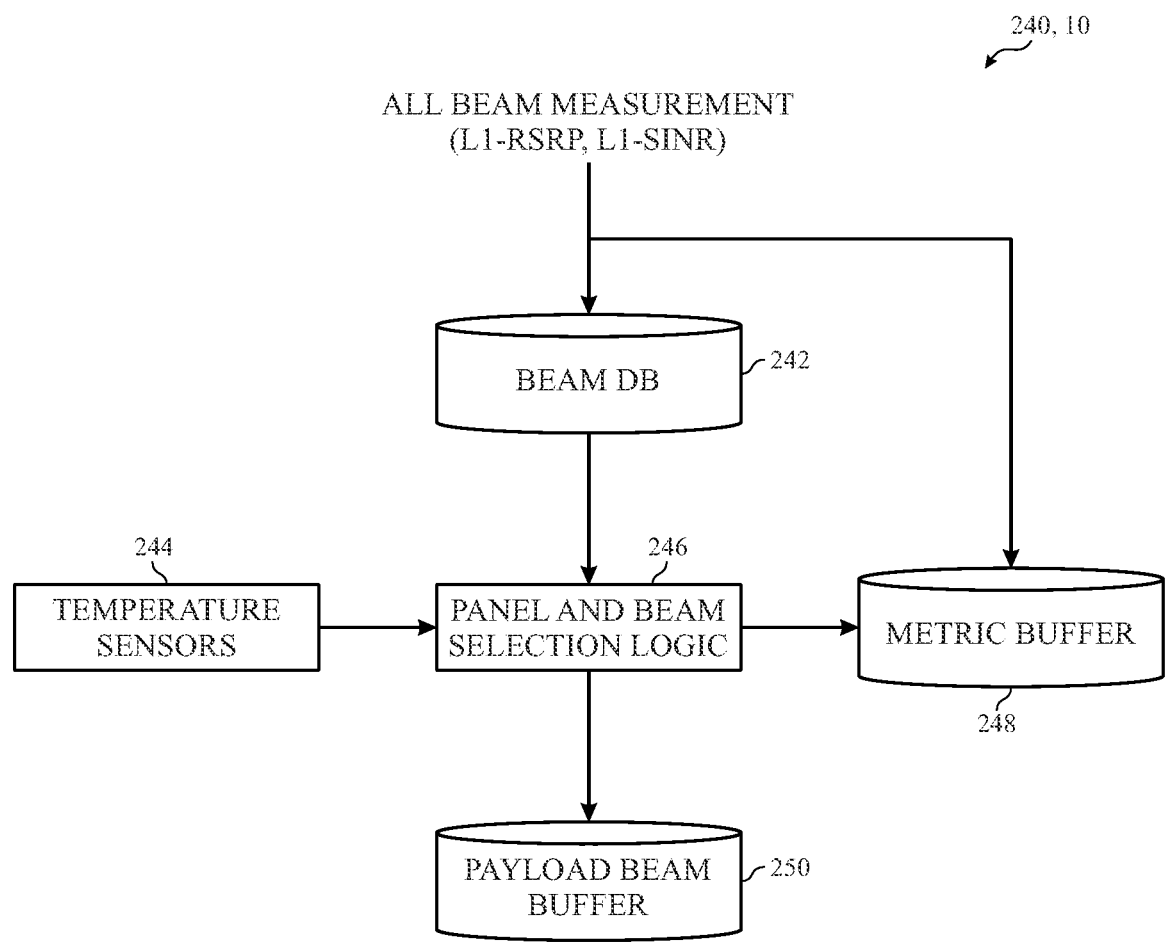
FIG. 7 is a block diagram of a beam configuration management system for selecting an antenna group based on temperature and power gain to form a beam for transmitting and/or receiving data, according to an embodiment of the present disclosure.

FIG. 7 is a block diagram of a beam configuration management system 240 that facilitates selecting an antenna group 53 based on temperature and power gain when forming a beam, according to an embodiment of the present disclosure. The electronic device 10 may use the beam configuration management system 240 for selecting an antenna group 53 and/or updating the selected antenna group 53 for communicating data using one or multiple beams. Each of the depicted components may be implemented using hardware (e.g., circuitry), software (e.g., machine-executable instructions), or both (e.g., logic). As illustrated, the beam configuration management system 240 may include a beam database 242, temperature sensors 244, antenna and beam selection logic 246, a metric buffer 248, and a payload beam buffer 250. However, it should be appreciated that in different embodiments, the beam configuration management system 240 may use different, additional, or less components to perform similar or different functions to facilitate selecting an antenna group 53 based on temperature and power gain for transmitting and/or receiving data.

By way of example, the beam database 242 may receive power gain measurements of multiple antenna groups 53 when forming beams. For example, the electronic device 10 may determine signal quality (e.g., power gain) of each antenna group 53 (e.g., antenna groups 53A-53G of FIG. 4) when forming one or more beams and store the power gains corresponding to each beam using the beam database 242. Moreover, the electronic device 10 may query the beam database 242 with one or more beams and may receive the power gains for each antenna group 53 to provide to the metric buffer 248 for reporting to one or more communication hubs (e.g., base stations).

The temperature sensors 244 may include the external temperature sensors 56 and/or the internal temperature sensors 58, determine temperature measurements associated with the antenna groups 53, and send the temperature measurements to the antenna and beam selection logic 246. As mentioned above, each of the temperature sensors 244 may provide updated temperature data according to a respective time interval. Accordingly, the temperature sensors 244 may provide updated temperature data, which the antenna and beam selection logic 246 may use to overwrite previous temperature data.

Accordingly, the antenna and beam selection logic 246 may facilitate selecting an antenna group 53 for data communication based on determining and/or receiving the temperature measurement and power gain for each antenna group 53 when forming a beam. That is, the antenna and beam selection logic 246 may receive and analyze the power gains of antenna groups 53 when forming a beam in a target direction that is stored on the beam database 242, and the temperature data provided by the temperature sensors 244. Based on the temperature data and the power gains, the antenna and beam selection logic 246 may determine and select the antenna group 53 with low temperature and high power gain. The antenna and beam selection logic 246 may also select a beam configuration for the selected antenna group 53 to transmit and/or receive data forming the beam in the target direction.

In some embodiments, the antenna and beam selection logic 246 may select the beam configuration based on requesting and receiving beam configuration information from a communication hub (e.g., after a delay corresponding to sending the request and receiving the beam configuration information). However, in additional or alternative embodiments, the antenna and beam selection logic 246 may apply a beam configuration used by a currently operating antenna group 53 to the selected antenna group 53 to facilitate switching antenna groups 53 without delay. The antenna and beam selection logic 246 may provide indications of the selected antenna group 53 and the beam configuration to the metric buffer 248 and/or the payload beam buffer 250. In some embodiments, the antenna and beam selection logic 246 may include processing circuitry such as the processor 12. Moreover, as mentioned above, the processor 12 may include application processor circuitry and baseband processing circuitry to perform radio frequency functions. As such, the antenna and beam selection logic 246 may be associated with the application processor circuitry, the baseband processor circuitry, or both.

The beam metric buffer 248 may store signal quality characteristics (e.g., reference signal received power (RSRP), RSRP when sending or receiving data over a certain frequency band, such as the L1 band (centered at 1575.42 megahertz (MHz)) (L1-RSRP), signal-to-interference-noise ratio (SINR), SINR when sending or receiving data over a certain frequency band, such as the L1 band (L1-SINR), and so on) for beam reporting to a communication hub. In particular, the electronic device 10 may report the signal quality characteristics (e.g., beam reporting metrics) that reflect the highest quality as part of a beam reporting process, as specified in the 3GPP 38.214 specification. The electronic device 10 may update the beam reporting metrics when the same antenna group 53 forming the same beam has been selected by the processor 12 based on its quasi co-location (QCL) configuration, and/or the signal quality characteristics are higher quality than a past version stored in the beam metric buffer 248. The payload beam buffer 250 may store beams (e.g., transmit or receive spatial filters) for each active transmission configuration indicator (TCI) state. In 5G New Radio (NR), a TCI state is used to establish the QCL connection between the target reference signals (RS) and source RS. Two antenna ports are quasi co-located if properties of the channel over which a symbol on one antenna port is conveyed can be inferred from the channel over which a symbol on the other antenna port is conveyed.

Figure 8:
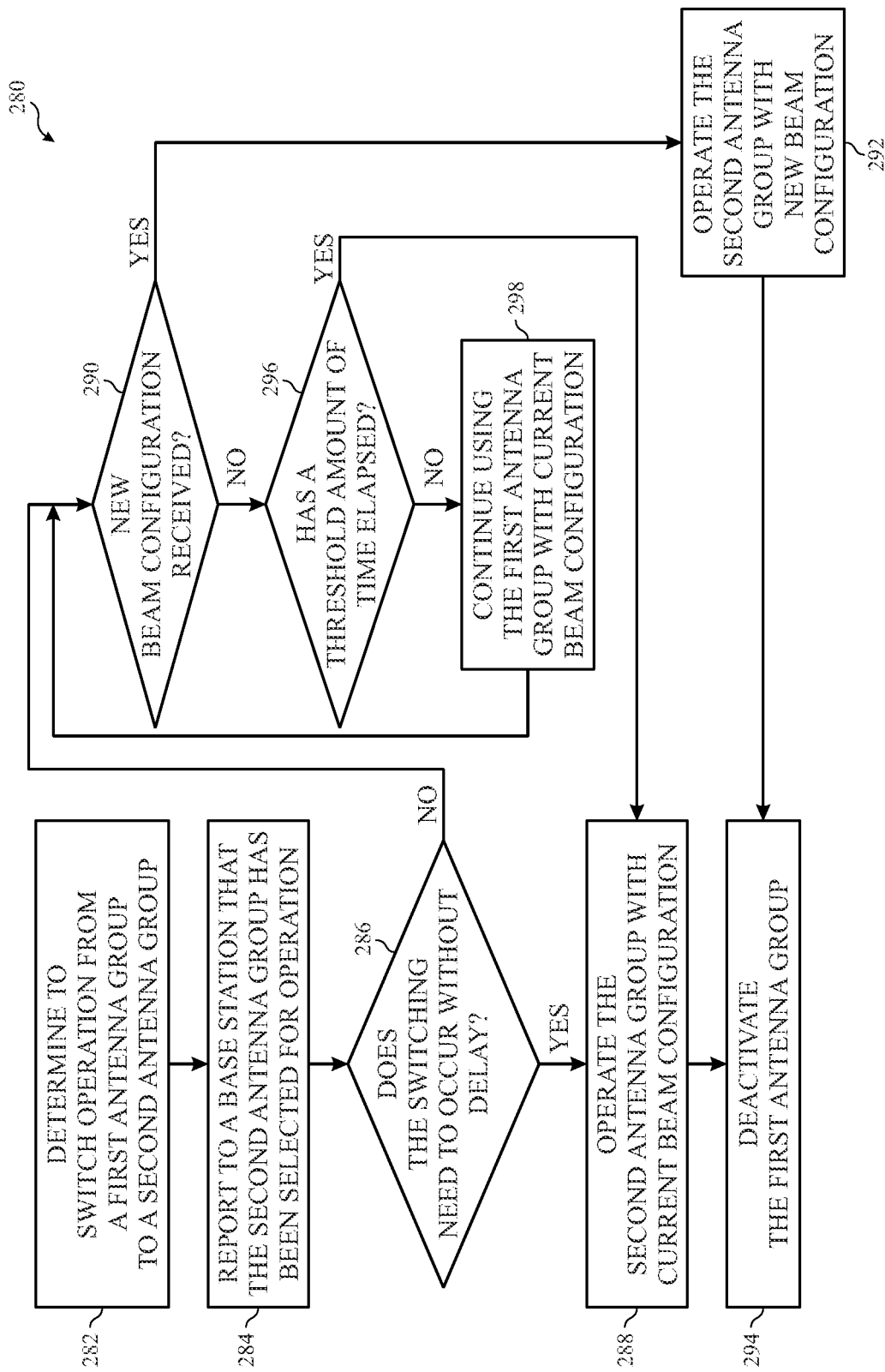
FIG. 8 is a flowchart of a process for beam configuration management, according to an embodiment of the present disclosure.

With the foregoing in mind, FIG. 8 is a flowchart of a process 280 for beam configuration management, according to an embodiment of the present disclosure. Specifically, the processor 12 may perform the process 280 to switch to another antenna group 53 when a temperature of currently operating antenna group 53 is at a high temperature (e.g., exceeds a temperature threshold). Similar to the processes 190 and 200 described above, the processor 12, in the form of the application processor and/or the baseband processor, may perform all or a portion of the process 280. While the blocks of the process 280 below are provided in a sequence, it should be understood that the blocks may be performed in different orders, and in some cases, blocks may be skipped entirely At block 282, the processor 12 determines to switch operation from a first antenna group 53 (e.g., a currently operating antenna group 53) to a second antenna group 53. In some embodiments, the processor 12 may determine to switch operation from the first antenna group 53 because that the first antenna group 53 exceeds a temperature threshold, and/or to mitigate a temperature of the first antenna group 53. The processor 12 may determine the second antenna group 53 using the process 190 of FIG. 5, the process 200 of FIG. 6, or both.

At block 284, the processor 12 reports to a base station that the second antenna group 53 has been selected for operation. In response, the base station may change an active TCI state. Moreover, the base station may select an appropriate beam for the second antenna group 53 to form. It should be understood that the base station is used herein as an example communication hub, such as a 5G Next Generation NodeB (gNB) or an LTE Evolved NodeB (eNB), and in different embodiments, different communication hubs may be used.

At block 286, the processor 12 determines whether the switching occurs with or without a delay. As mentioned above, the processor 12 may switch antenna groups 53 without delay when delayed switching may result in reduced lifespan of the electronic device 10. For example, the processor 12 may determine to switch without delay when the temperature of the first antenna group 53 is provided by an internal temperature sensor 58. Because the internal temperature sensor 58 may be located at critical areas of the electronic device 10 (e.g., circuit junctions, display components, radio frequency communication components, and so on), allowing high temperatures to continue at the internal temperature sensor 58 may shorten the lifespan of the electronic device. As another example, the processor 12 may switch antenna groups 53 without delay when a temperature of the first antenna group 53 is increasing at rate higher than a threshold, when a temperature of the first antenna group 53 increases above a threshold, and so on. In different embodiments, the processor 12 may switch antenna groups 53 without delay based on any other suitable criteria.

When switching antenna groups 53 without delay, the processor 12 operates the second antenna group 53 with a current beam configuration at block 288. That is, the processor 12 may operate the second antenna group 53 with a beam configuration used by the (currently operating) first antenna group 53 for transmitting and/or receiving data. In some embodiments, the transmission and/or reception efficiency of the processor 12 may reduce when using the beam configuration of the first antenna group 53 with the second antenna group 53, as it was not configured for the second antenna group 53. Accordingly, the processor 12 may use a new beam configuration configured for the second antenna group 53 when the new beam configuration is received from the base station. For example, the base station may send the new beam configuration to the electronic device 10 in response to receiving the report from the electronic device 10 that the second antenna group 53 has been selected for operation at block 284. In some embodiments, the base station may send the new beam configuration to the electronic device 10 in response to receiving a new beam report (e.g., as provided by the metric buffer 248).

However, at block 286, when the switching does not need to occur without delay, the processor 12 proceeds to block 290. For example, the high temperature may be based on temperature measurements of the external temperature sensors 56 (e.g., such that the temperature measurements are likely not to reduce the lifespan of the electronic device 10), the high temperature may not exceed a threshold for switching without delay, or the like. At block 290, the processor 12 determines whether a new beam configuration for the second antenna group 53 has been received. As noted above, the base station may send the new beam configuration to the electronic device 10 in response to receiving the report from the electronic device 10 that the second antenna group 53 has been selected for operation at block 284, or in response to receiving a new beam report (e.g., as provided by the metric buffer 248).

If the new beam configuration has not been received, the processor 12 determines whether a threshold amount of time has elapsed, at block 296. In some embodiments, the threshold amount of time may correspond to a synchronization time (e.g., adaptation time, predetermined adaptation time) between the base station and the processor 12 based on transmitting the request for the new beam configuration (e.g., synchronous switching time). In additional or alternative embodiments, the threshold amount of time may correspond to a maximum time that may ensure receiving the new beam configuration based on transmitting the request for the new beam configuration. The threshold amount of time may be on the order of a few Synchronization Signal Block (SSB) burst periods (e.g., 5 milliseconds (ms) each). That is, the threshold amount of time may include 0.1-100 ms, 1-25 ms, 5-20 ms, and so on.

If the threshold amount of time has elapsed at block 296, the processor 12 operates the second antenna group 53 with the current beam configuration at block 288. That is, the processor 12 may operate the second antenna group 53 with a beam configuration used by the (currently operating) first antenna group 53 for transmitting and/or receiving data. As previously mentioned, the transmission and/or reception efficiency of the processor 12 may reduce when using the beam configuration of the first antenna group 53 with the second antenna group 53, as it was not configured for the second antenna group 53. Accordingly, the processor 12 may use a new beam configuration configured for the second antenna group 53 when the new beam configuration is received from the base station.

On the other hand, if the new beam configuration has been received at block 290, then the processor 12 proceeds to block 292 to operate the second antenna group 53 with the new beam configuration. Subsequently, after operating the second antenna group 53 with the current beam configuration at block 288 or with the new beam configuration at block 292, the processor 12 deactivates the first antenna group 53 at block 294. Accordingly, the method 280 enables beam configuration management, and more specifically, enables switching to another antenna group 53 when a temperature of currently operating antenna group 53 is at a high temperature. It should be appreciated that a high temperature of the processor 12 may change during the delayed switching of the antenna groups 53. Accordingly, in some embodiments, the processor 12 may periodically determine the temperature of the antenna groups 53 at any point in the process 280, and, for example, restart the process 280, cancel certain blocks of the process 280 to continue using the first antenna group 53, and so on.

Figure 9:
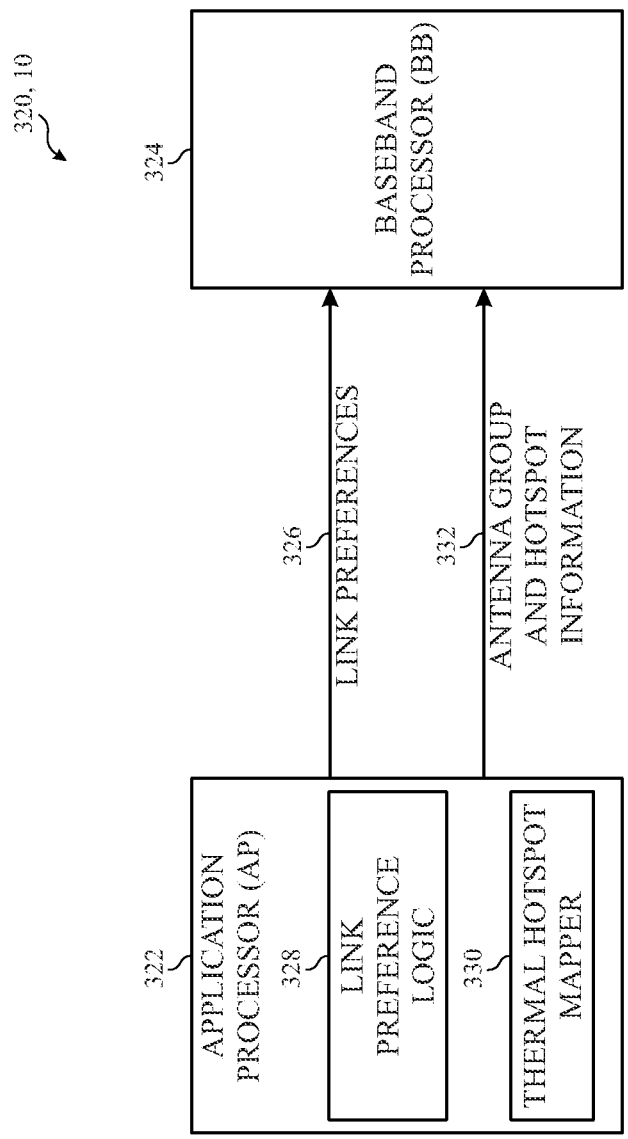
FIG. 9 is a block diagram of a system for determining antenna groups for data transmission and/or reception based on link preferences and thermal hotspots of the electronic device of FIG. 1, according to an embodiment of the present disclosure.

Turning now to FIG. 9, a system 320 is depicted for determining antenna groups 53 (e.g., antennas 54) for data transmission and/or reception based on link preferences and thermal hotspots of the electronic device 10. In some embodiments, multiple antenna groups 53 may include similar temperature and power gains when forming a beam. However, data transmission and/or reception using such antenna groups 53 may have different impacts on link characteristics and/or thermal hotspots of the electronic device 10. The link preferences may include a data rate or throughput as specified by or estimated to execute one or more software applications (e.g., stored in the memory 14 of the electronic device 10) by the processor 12. In some embodiments, the link preferences may include a latency executing the one or more software applications. A thermal hotspot may include an area of the electronic device that may exhibit an increased rise in temperature due to operation of an antenna group at that location. That is, an antenna array at a thermal hotspot may see an increased rise in temperature during operation when compared to the same antenna array operating at a non-thermal hotspot location.

For example, data transmission and/or reception using an antenna group 53 disposed in the thermal hotspots of the electronic device 10 may result in high rate of temperature increase in the antenna group 53 and components at or near the thermal hotspots. Moreover, a signal quality (e.g., power gain) of the antenna group 53 may also be reduced due to the placement of the antennas 54 of the selected antenna group 53 in the thermal hotspot. Accordingly, the electronic device 10 may prioritize using antenna groups 53 disposed outside of any thermal hotspots to prevent reduction of lifespan of the electronic device 10 based on rapid temperature increase in the thermal hotspot areas.

An application processor 322 and a baseband processor 324 (e.g., which may both or each be representative of the processor 12) may prioritize selection of antenna groups 53 that fulfill the link preferences and/or are disposed outside the hotspots. In the depicted embodiment, the application processor 322 may communicate the link preferences 326 of the electronic device 10 to the baseband processor 324. In particular, the application processor 322 may determine the link preferences 326 using link preference logic 328. For example, the link preference logic 328 may include dedicated circuitry, software, or both, for determining the link preferences 326. In some embodiments, the link preference logic 328 may determine the data rate, throughput, and/or the latency preferences (e.g., estimated usage, specification, requirements, and so on) based on an application (e.g., software) running on the electronic device 10 and/or the processor 12. For example, the link preference logic 328 may determine the link preferences 326 based on a current use case of the electronic device 10 for transmitting and/or receiving data, including whether a user is placing a phone call, browsing the Internet, streaming a video, and so on.

Moreover, the application processor 322 may use a thermal hotspot mapper 330 to determine the thermal hotspots of the electronic device 10. The thermal hotspot mapper 330 may include dedicated circuitry, software, or both, for determining the thermal hotspots of the electronic device 10. Subsequently, the application processor 322 may determine antenna groups 53 disposed outside the determined thermal hotspots. The application processor 322 may then transmit antenna group and hotspot information 332 to the baseband processor 324 indicative of whether each antenna group 53 is disposed in a thermal hotspot.

With that in mind, the baseband processor 324 may determine an antenna group 53 for transmitting and/or receiving data when forming a beam based on the link preferences 326 and the antenna group and hotspot information 332. That is, the baseband processor 324 may select the antenna group 53 capable of data communication according to the link preferences 326 and/or disposed outside the hotspots. In some embodiments, the processor 12 may also use the determined temperatures and power gains described above for selecting the antenna group 53. Accordingly, the selected antenna group 53 may include data communication capability based on the link preferences 326, antennas 54 disposed outside thermal hotspots, temperature less than the threshold temperature, and/or power gain above the gain threshold.

In additional or alternative embodiments, the baseband processor 324 may apply weights to antenna groups 53 satisfying the link preferences 326, antenna groups 53 disposed outside thermal hotspots, antenna groups 53 having temperatures below the temperature threshold, and antenna groups 53 having power gains above the gain threshold. That is, the baseband processor 324 may weigh some of these antenna groups 53 heavier than others based on the weights applied. In another example, the baseband processor 324 may neglect one or more of the factors discussed when selecting the antenna group 53, for example, when no antenna group 53 satisfies all the antenna selection factors and/or criteria.

Figure 10:
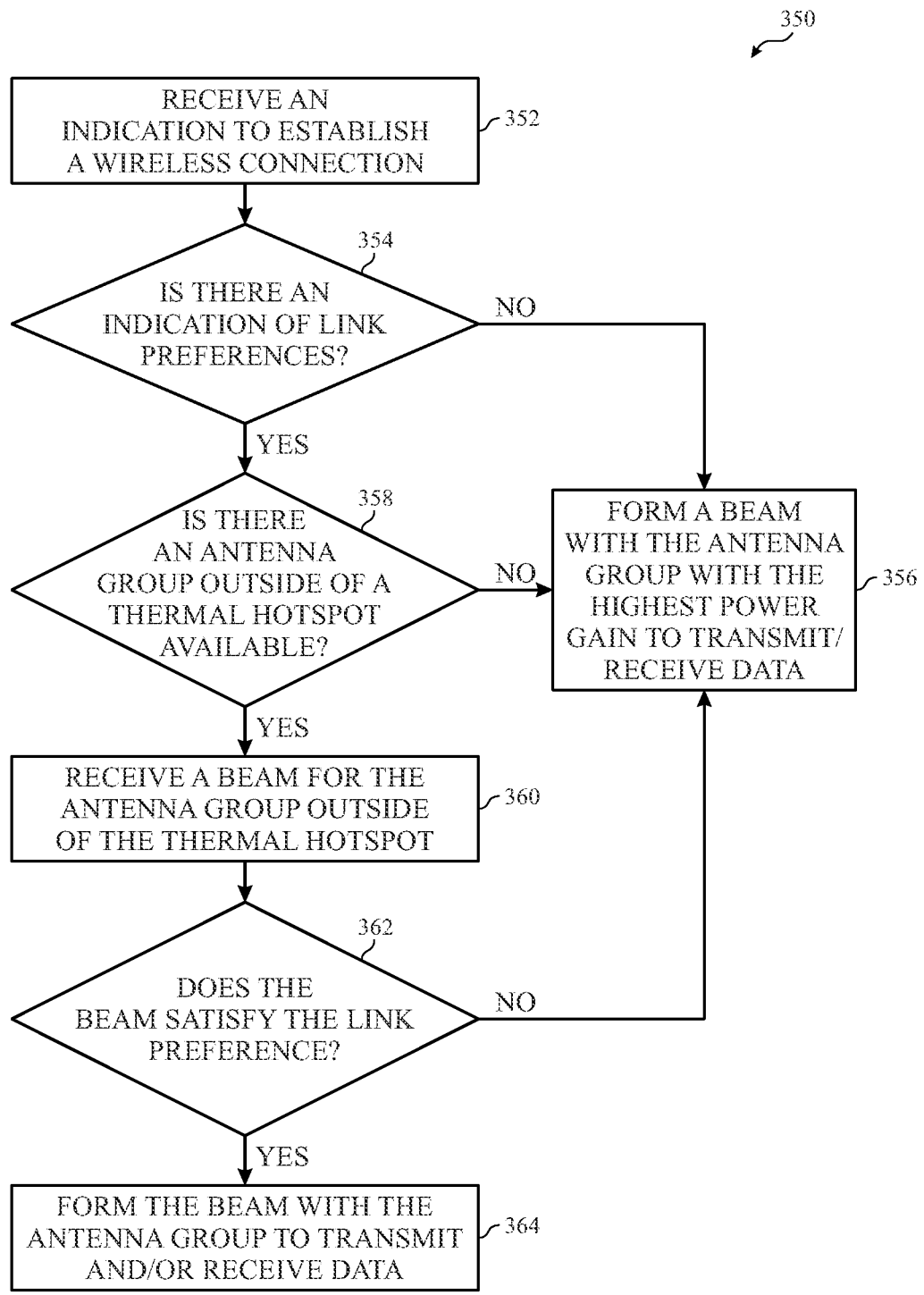
FIG. 10 is a flowchart of a process for selecting an antenna group based on link preferences and antenna group and hotspot information, according to an embodiment of the present disclosure.

Referring now to FIG. 10, a process 350 for selecting an antenna group 53 based on the link preferences 326 and the antenna group and hotspot information 332 described above is illustrated, according to an embodiment of the present disclosure. The application processor 322 and/or the baseband processor 324 of the processor 12 described above with respect to FIG. 9 may perform all or a portion of the process 350. While the blocks of the process 350 below are provided in a sequence, it should be understood that the blocks may be performed in different orders, and in some cases, blocks may be skipped entirely At block 352, the processor 12 receives an indication to establish a wireless connection for data transmission and/or reception. Subsequently, at block 354, the processor 12 determines whether there is an indication of link preferences 326. For example, as discussed above with respect to the system 320 of FIG. 9, the link preference logic 328 may determine data rate, throughput, and/or the latency preferences of one or more software application executing on the electronic device 10, and send one or more of the preferences 326 to the baseband processor 324. Accordingly, the processor 12 may determine there is an indication of the link preferences 326. However, in some instances, the link preference logic 328 may not generate any link preferences 326, and, as such, no link preferences 326 are received by the baseband processor 324.

At block 354, when the processor 12 determines that there is no indication of link preferences 326, the processor 12 proceeds to block 356. At block 356, the processor 12 forms a beam with an antenna group 53 with the highest power gain to transmit and/or receive data. In additional or alternative embodiments, at block 356, the processor 12 proceeds to select an antenna group 53 for data transmission and/or reception using the processes 190, 200, and/or 280 to select an antenna group 53 with low temperature and high power gain at a respective switching (or selection/activation) time. Accordingly, at block 356, the processor 12 may select the antenna group 53 with highest power gain (e.g., highest bandwidth, highest data rate, highest throughput, lowest latency) that may not cause reduced data communication quality and/or reduced lifespan of the electronic device 10 due to high temperature. In another embodiment, the processor 12 may form a beam with an antenna group 53 with the lowest temperature.

However, when the processor 12 determines an indication of link preference at block 354, the processor 12 may proceed to block 358. At block 358, the processor 12 determines whether one or more antenna groups 53 are disposed outside of a thermal hotspot are available for data communication. In some embodiments, the processor 12 may determine antenna groups 53 that are at least partially (e.g., have at least some antennas 54) disposed outside of thermal hotspots. As mentioned above, the thermal hotspot mapper 330 of the application processor 322 may provide such information to the baseband processor 324. When no antenna group 53 is available outside of thermal hotspots at block 358, the processor 12 proceeds to block 356 to form a beam with the antenna group 53 with highest power gain to transmit and/or receive data.

When an antenna group 53 is determined to be is available outside of a thermal hotspot at block 358, the processor 12 proceeds to block 360. At block 360, the processor 12 receives a beam for the antenna group 53 disposed outside of the thermal hotspot from a base station. For example, at block 360, the processor 12 may request a beam configuration from base station, report a selection of the antenna group 53, and so on, and receive the beam configuration in return.

Subsequently, at block 362, the processor 12 determines whether the beam satisfies the link preferences 326 (as referenced at block 354). In particular, the processor 12 may determine whether the beam configuration received from the base station in block 360 may enable data communication using the antenna group 53 that satisfies an estimated (or required) throughput, latency, or both, indicated by the link preferences 326. When the beam does not satisfy the link preferences 326, the processor 12 proceeds to block 356 to form a beam with the antenna group 53 with highest power gain to transmit and/or receive data. That is, when the beam does not satisfy the link preferences 326, the processor 12 may not use the antenna group 53 determined at block 358. However, when the beam satisfies the link preferences 326, the processor 12 proceeds to block 364 to form the beam with the antenna group 53 to transmit and/or receive data.

Accordingly, the process 350 may select an antenna group 53 based on the link preferences 326 and antenna group and hotspot information 332. Moreover, the processor 12 may perform the process 350 repeatedly, upon receiving a triggering event, or may iterate through portions of the process, for example, upon receiving updated temperature measurements, gain measurements, requests for establishing wireless connections, time periods, and so on.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device comprising:
   a plurality of antenna groups;
   transmit circuitry communicatively coupled to the plurality of antenna groups;
   receive circuitry communicatively coupled to the plurality of antenna groups; and
   processing circuitry configured to
      communicate with a communication hub using a first antenna group of the plurality of antenna groups;
      determine a temperature of the first antenna group;
      determine a set of antenna groups of the plurality of antenna groups that each have a temperature that is less than or equal to a temperature threshold;
      exclude antenna groups from the set of antenna groups that have a power gain less than or equal to a gain threshold;
      exclude antenna groups from the set of antenna groups that have a temperature within a threshold temperature range of an additional antenna group of the set of antenna groups and have a lower power gain than the additional antenna group;
      select a second antenna group having a lowest temperature from a remainder of the set of antenna groups; and
      cause the transmit circuitry to communicate with the communication hub using the second antenna group in response to determining that the temperature of the first antenna group exceeds the temperature threshold.

2. The electronic device of claim 1, comprising one or more internal temperature sensors configured to determine an internal temperature of the electronic device, the temperature of the first antenna group being based on the internal temperature of the electronic device, and the temperature threshold being associated with the internal temperature of the electronic device.

3. The electronic device of claim 2, wherein the processing circuitry is configured to cause the transmit circuitry or the receive circuitry to form a beam to transmit data to the communication hub or receive data from the communication hub using the first antenna group, and, in response to determining that the temperature of the first antenna group exceeds the temperature threshold associated with the internal temperature of the electronic device and the power gain of the second antenna group for receiving data from the communication hub exceeds the gain threshold, cause the transmit circuitry or the receive circuitry to form the beam to transmit data to the communication hub or receive data from the communication hub using the second antenna group.

4. The electronic device of claim 2, wherein the temperature threshold is between 36 and 40 degrees Celsius.

5. The electronic device of claim 1, comprising one or more external temperature sensors configured to determine an external temperature of the electronic device, the temperature of the first antenna group being based on the external temperature of the electronic device, and the temperature threshold being associated with the external temperature of the electronic device.

6. The electronic device of claim 1, wherein, in response to determining that the temperature of the first antenna group exceeds the temperature threshold and the power gain of the second antenna group for receiving data from the communication hub exceeds the gain threshold, the processing circuitry is configured to request and receive a beam configuration from the communication hub for transmitting data to the communication hub or receiving data from the communication hub using the second antenna group.

7. The electronic device of claim 6, wherein, in response to not receiving the beam configuration from the communication hub within a threshold time, the processing circuitry is configured to cause the transmit circuitry or the receive circuitry to form a beam using a current beam configuration used by the first antenna group with the second antenna group.

8. The electronic device of claim 6 wherein the processing circuitry is configured to cause the transmit circuitry or the receive circuitry to form a beam using the beam configuration to transmit data to the communication hub or receive data from the communication hub using the second antenna group.

9. The electronic device of claim 1, wherein the temperature threshold is between 105 and 115 degrees Celsius.

10. The electronic device of claim 1, wherein the gain threshold is based on a highest power gain of the set of antenna groups.

11. The electronic device of claim 1, wherein the gain threshold is 3 decibels less than a highest power gain of the set of antenna groups.

12. A method comprising:
   communicating, using at least one processor, with a communication hub using a first antenna group of a plurality of antenna groups of an electronic device;
   determining, using the at least one processor, a first temperature of the first antenna group and a second temperature of a second antenna group of the plurality of antenna groups;
   determining, using the at least one processor, that the first temperature exceeds a temperature threshold and the second temperature is less than the temperature threshold;
   determining, using the at least one processor, that a power gain of the second antenna group exceeds a gain threshold when forming a beam; and
   in response to determining that the first temperature exceeds the temperature threshold, the second temperature is less than the temperature threshold, and the power gain of the second antenna group exceeds the gain threshold when forming the beam, forming, using the at least one processor, the beam using the second antenna group.

13. The method of claim 12, wherein the power gain corresponds to a downlink wireless power gain when forming the beam.

14. The method of claim 12, comprising
determining, using the at least one processor, an estimated throughput, an estimated latency, or both, to execute one or more software applications by the at least one processor, and
determining, using the at least one processor, that the beam formed by using the second antenna group enables the estimated throughput, the estimated latency, or both,
wherein forming, using the at least one processor, the beam using the second antenna group occurs in response to determining that the beam formed by using the second antenna group enables the estimated throughput, the estimated latency, or both.

15. The method of claim 12, comprising:
forming, using the at least one processor, the beam to transmit data to the communication hub or receive data from the communication hub using the first antenna group; and
forming, using the at least one processor, the beam to transmit data to the communication hub or receive data from the communication hub using the second antenna group in response to the first temperature exceeding the temperature threshold and the power gain of the second antenna group exceeding the gain threshold.

16. A tangible, non-transitory, machine-readable medium, comprising machine-readable instructions that, when executed by at least one processor, cause at least one processor to:
communicate with a communication hub using a first antenna group of a plurality of antenna groups of an electronic device;
determine a first temperature of the first antenna group and a second temperature of a second antenna group of the plurality of antenna groups;
determine that the first temperature exceeds a temperature threshold and the second temperature is less than the temperature threshold;
determine that a power gain of the second antenna group exceeds a gain threshold when forming a beam; and
in response to determining that the first temperature exceeds the temperature threshold, the second temperature is less than the temperature threshold, and the power gain of the second antenna group exceeds the gain threshold when forming the beam, form the beam using the second antenna group.

17. The tangible, non-transitory, machine-readable medium of claim 16, wherein the machine-readable instructions, when executed by the at least one processor, cause the at least one processor to determine that a downlink wireless power gain of the second antenna group exceeds a gain threshold when forming a beam.

18. The tangible, non-transitory, machine-readable medium of claim 16, wherein the machine-readable instructions, when executed by the at least one processor, cause the at least one processor to:
determine an estimated throughput, an estimated latency, or both, to execute one or more software applications; and
determine that the beam formed by using the second antenna group enables the estimated throughput, the estimated latency, or both,
wherein forming the beam using the second antenna group occurs in response to the beam formed by using the second antenna group enabling the estimated throughput, the estimated latency, or both.

19. The tangible, non-transitory, machine-readable medium of claim 16, wherein the machine-readable instructions, when executed by the at least one processor, cause the at least one processor to form the beam to transmit data to the communication hub or receive data from the communication hub using the first antenna group, and, in response to the first temperature exceeding the temperature threshold and the power gain of the second antenna group exceeding the gain threshold, form the beam to transmit data to the communication hub or receive data from the communication hub using the second antenna group.

20. The tangible, non-transitory, machine-readable medium of claim 16, wherein the machine-readable instructions, when executed by the at least one processor, cause the at least one processor to, in response to the first temperature exceeding the temperature threshold and the power gain of the second antenna group exceeding the gain threshold, request and receive a beam configuration from the communication hub for transmitting data to the communication hub or receiving data from the communication hub using the second antenna group.

* * * * *